United States Patent [19]
Persson

[11] 3,916,456
[45] Nov. 4, 1975

[54] CONTAINER FOR THE MOULDERING OF ORGANIC WASTE

[75] Inventor: Nils Christer Persson, Ostersund, Sweden

[73] Assignee: Inventor AB OPE, Ostersund, Sweden

[22] Filed: Mar. 19, 1974

[21] Appl. No.: 452,518

Related U.S. Application Data

[63] Continuation of Ser. No. 242,395, April 10, 1972, abandoned.

[30] Foreign Application Priority Data
Apr. 16, 1971 Sweden.............................. 4961/71

[52] U.S. Cl. ................ 4/131; 4/DIG. 12; 23/259.1; 71/9; 210/175
[51] Int. Cl.² ......................................... A47K 11/03
[58] Field of Search .............. 4/1, DIG. 4, 116, 118, 4/216, 131–133, 135, 136, 141, 142, 221, 211, DIG. 12, 10, 111, 134; 110/9 R, 9 E; 210/175; 23/259.1; 71/21, 24, 9, 12; 99/446

[56] References Cited
UNITED STATES PATENTS

| | | | |
|---|---|---|---|
| 112,010 | 2/1871 | Bergquist | 4/136 |
| 1,401,091 | 12/1921 | Lucas | 4/216 |
| 3,136,608 | 6/1964 | Lindstrom | 4/133 |
| 3,522,613 | 8/1970 | Botsford | 4/131 |
| 3,555,995 | 1/1971 | Berger | 99/446 |
| 3,633,220 | 1/1972 | Lagstrom | 4/131 |
| 3,683,426 | 8/1972 | Lagstrom | 4/116 X |
| 3,808,609 | 5/1974 | Andersson et al. | 4/133 |

*Primary Examiner*—John W. Huckert
*Assistant Examiner*—Stuart S. Levy
*Attorney, Agent, or Firm*—Young & Thompson

[57] ABSTRACT

A container for moulderable organic waste such as toilet refuse or moulderable kitchen garbage, having a grate provided freely above the bottom of the container, and an inlet for air to be circulated below the grate and upwardly to an outlet at the top of the container, the container being of such small size that its width is less than about one meter.

1 Claim, 5 Drawing Figures

U.S. Patent  Nov. 4, 1975  3,916,456
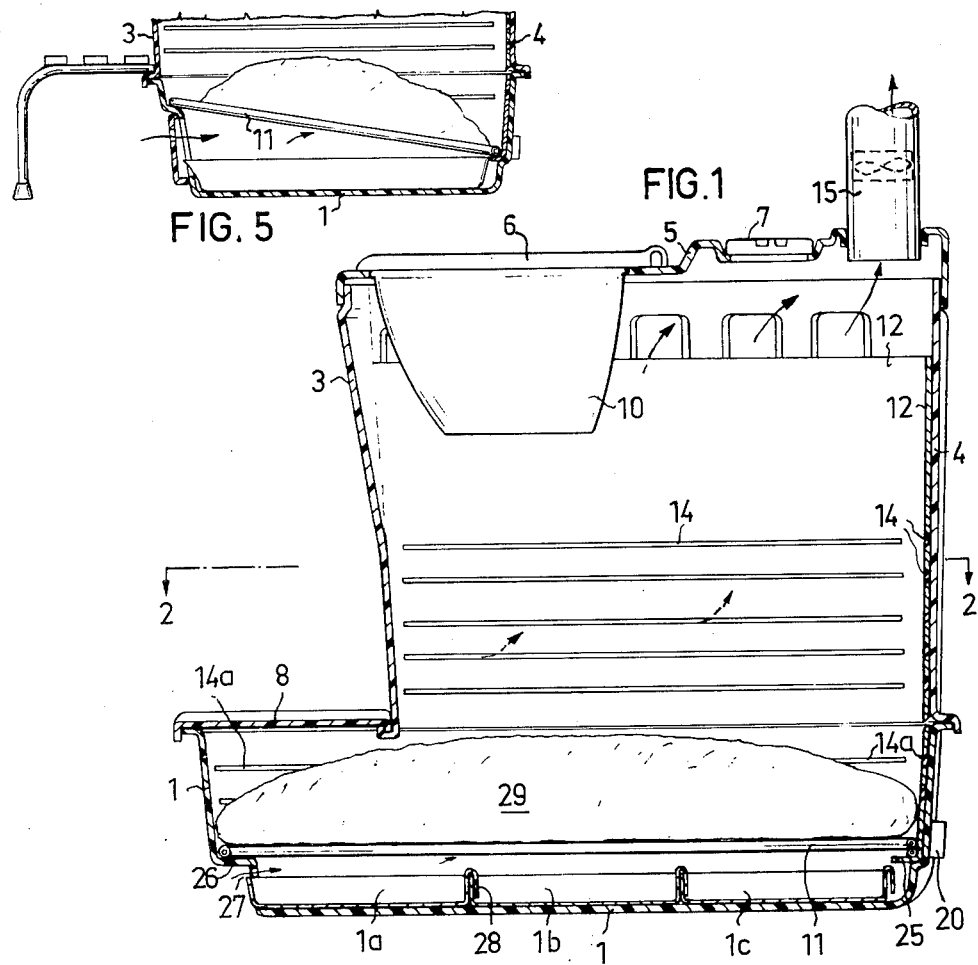
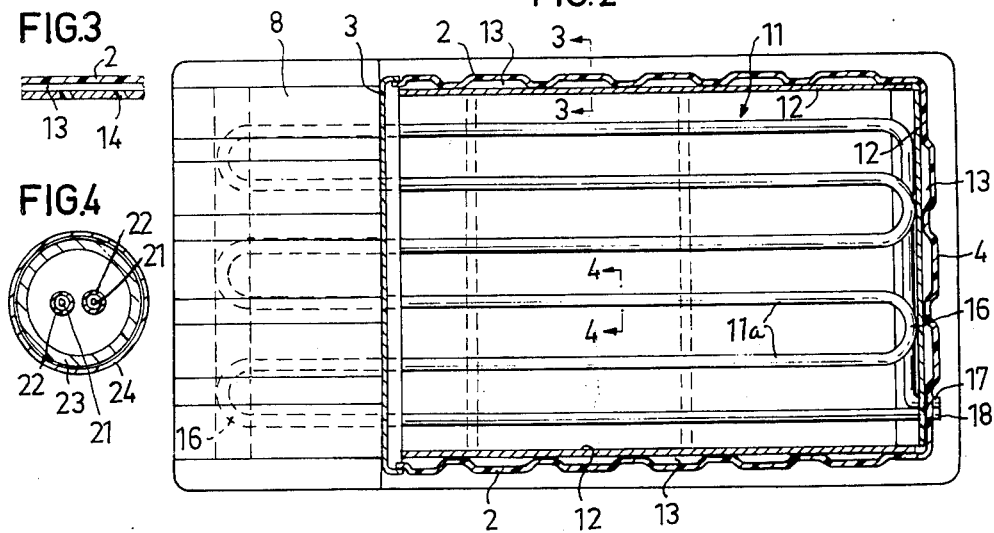

CONTAINER FOR THE MOULDERING OF ORGANIC WASTE

This is a continuation of application Ser. No. 242,395, filed Apr. 10, 1972, now abandoned.

The present invention relates to a container for moulderable organic waste.

The purpose of the invention is, inter alia, to provide a container having small enough dimensions so that it can be placed on the floor of a comparatively small room, e.g. in a summer house and functioning so effectively that in normal cases it need be emptied only a few times per year when used in an average household. This is achieved by a container as described hereinafter, a suitable embodiment of the container according to the invention being shown in the drawing, in which:

FIG. 1 is a vertical section through the container,

FIG. 2 is a cross section following the line 2—2 in FIG. 1,

FIG. 3 is a section following the line 3—3 in FIG. 2,

FIG. 4 is a section following the line 4—4 in FIG. 2, and

FIG. 5 is a partial sectional view of the bottom portion of a simplified embodiment.

The container shown in FIG. 1 consists of a separate bottom case 1, two separate side walls 2, a separate front 3, a separate rear wall 4, and a separate top 5 which parts are interconnected, and within the enclosure thus formed the organic waste material is stored during the mouldering. On the top 5 there is a discharge 6 for toilet refuse having a tightly closable toilet seat, and a discharge 7 for kitchen garbage having a tightly closable cover. Below the discharge 6 there is provided a removable bowl 10 having holes in its bottom.

The floor of the bottom case is horizontal or slightly inclined, and a little above the bottom of said bottom case 1 there is a grate 11.

The insides of the side walls 2, the rear wall 4, and the extensions of these surfaces down towards the bottom case 1 are all lined with inner walls 12 of compost resisting material; the outer walls 2 and 4 or their corresponding inner walls 12 are shaped to form between them air ducts 13 according to FIGS. 2 and 3. Also, the inner walls 12 of the walls 2 and 4 are provided with slots 14 allowing the air in the air ducts 13 to enter the compost. It is advantageous to cut these slots at an angle of more than 0° to the plane normal of the inner walls 12 and to incline them so that they slope downwards towards the interior of the assembly, as shown in FIG. 3. This is to prevent the compost material from unnecessarily passing through the slots 14 and into the air ducts 13. The width of the slots 14 should also be less than the depth and width of the air ducts 13 so that compost material still entering the air ducts 13 may easily fall down in same to the bottom of the bottom case 1 where three collecting cases 1a, 1b and 1c are provided, a single case being used in FIG. 5.

The air slots 14 and air ducts 13 can also be produced in a different manner. Along the inner walls 12 air ducts 13 can be obtained by shaping said walls to have ridges open at their tops so that air slots are formed, which ridges must be conical towards the interior of the container so that their broad bases are turned towards the outer walls 2 and 4. By this structure of the air ducts and air slots said ducts will widen the farther away one gets from the compost, which means that any compost material entering the air duct will have enough room to fall down in same to the bottom of the bottom case 1.

The ventilation air enters the container through an opening 27 on the front side of the bottom case 1, flows in below the grate 11 and spreads along the side walls 2 and the rear wall 4 where it rises in the air ducts 13, penetrates into the waste material through the air slots 14 and then leaves the container through a ventilation tube 15 disposed either on the top 5 or in its vicinity near one of the walls 2 or the rear wall 4. By making the air ducts 13 in the rear wall 4 deeper than those in the side walls 2, the air resistance is reduced there as compared with the remaining air ducts, causing the air to avoid the short cut to the front 3 and the side walls 2 and to flow instead the whole way along the bottom of the bottom case 1, across the cases 1a, 1b and 1c, to the rear wall 4, and up into its ducts.

The cases 1a, 1b and 1c are intended for collecting and removing decomposed waste fallen down through the grate 11.

As shown in FIG. 1, the grate 11 is placed at a height above the container bottom to allow sufficient air circulation below the grate. In the shown example the grate consists of a plurality of parallel tubes 11a which at their ends 16 are interconnected and form a continuous loop of which one end 17 at the rear wall 4 extends below the grate and is elongated together with the other loop end 18, said ends being connected with an electrical service box 20 or transformer on the back side of the container.

FIG. 4 shows that the grate tubes contain one or more electric resistance wires 21, each surrounded by an electrically insulating and heat resistant tube 22 placed within a strong metal tube 23, the latter serving as a screen and being in its turn protected from corrosion by an exterior heat resistant hose 24. At the box 20 the resistance wire is connectable with the electricity supply system.

The power of the resistance wire may be between 50 and 300 watts but in practical tests a power of about 150 watts has proved sufficient to maintain the desired surface temperature of the grate rods whose temperature should be in the range 40° to 105°C. A suitable surface temperature is about 70°C as disease-breeding worms, ova and bacteria are sterilised at 65° to 70°C, yet at temperatures above 40°C certain groups of microorganisms contributing to the mouldering are also killed. If one wishes them to survive during and after the passage through the grate, the lower temperature limit should be used. A temperature of 105°C is the highest temperature to which the most suitable corrosion-preventing material, PVC, is resistant. The distance between the tubes 11a may be within the range 3 to 12 cm, a suitable value being about 7 cm. The outer diameter of the tubes is suitably between 10 and 20 mm to make them capable of carrying the amount of material capable of mouldering for which the container is intended.

As evident from FIG. 1, the grate is placed on a rear support moulding 25 forming at the same time a cover moulding above the edge of the back case 1c, and on a front support in the form of an interior shoulder 26 on the front wall of the bottom case 1, below which shoulder there is provided the opening 27 of the bottom case 1 through which opening the cases 1a, 1b and 1c can be inserted and withdrawn and through which opening the ventilation air also enters, as shown in FIG. 1.

The cases 1a, 1b and 1c are shaped so that the rear edge forms a hook 28 to be hooked onto the straight front edge of the adjacent case as shown in FIG. 1. This arrangement makes it possible to withdraw the cases and hook them off one by one when they are to be emptied. Thus, the free space in front of the container need only exceed by little the length of the cases, which is of great importance when the container is to be placed in a comparatively small room.

The container is mounted at the place of use by fastening together the walls 2, 2, 3 and 4, the top 5 and the bottom case 1 with screws. The tube 15 is mounted so that it projects into the open air. In normal cases this mounting should not require much technical knowledge. An electrically operated fan is disposed in the air outlet to move the air through the tube 15. The box 20 is connected with the electricity supply system.

To accelerate the starting of the mouldering process, the container bottom case can be delivered together with a bag 29 resting on the grate. The bag 29 is made of paper or is a similar, mouldurable bag, perforated to let in air. Said bag 29 is filled with a mixture of dry mull and topsoil from a topsoil stratum containing the necessary microorganisms. Specially cultivated microorganisms can also be supplied to the bag.

The volume proportion of dry mull to soil is about 3 to 1. The thickness of the bag ought to be about 10 to 25 cm, and the bag is large enough to cover the larger portion of the grate 11, as shown in FIG. 1.

In practical tests it became clear that the container size may be very small. It is sufficient that the distance between the filling opening near the toilet seat 6, thus the underside of the top 5, and the container bottom, i.e. the bottom of the bottom case 1, as well as the distance between the container side walls 2, be less than one meter, which allows the container to be placed without difficulty in small summer cottage rooms where one usually places a chemical toilet.

Although the mouldering procedure is known per se, the invention involves an unexpectedly simple and small arrangement for achieving and maintaining the mouldering action in a manner that is extremely swift, hygienic, and easy to perform, the mouldered substance being at the same time a desirable end product non-polluting.

What is claimed is:

1. A container for moulderable organic waste, comprising two side walls, a front wall, a rear wall, a bottom and an upper wall having a least one filling opening, a closure for said filling opening, a grate supported on and within said container above said bottom wall to support said moulderable material and to successively release mouldered material through the grate so that said material can be collected, said grate comprising a plurality of parallel metal tubes disposed in parallel side by side relation which at their ends are interconnected and form a continuous loop that extends across the bottom of the container substantially from said front wall to said rear wall and substantially from one of said side walls to the other of said side walls, an electrically insulated electric heating wire disposed in and extending along said tube from end to end thereof, an air inlet through one of said walls below said grate, a ventilation pipe extending from the upper portion of the container, an electrically operated air fan in said ventilation pipe for exhausting air and gases from said container, a corrosion-resistant housing comprising a tubular sleeve of polyvinyl chloride surrounding said tube, the power of said electric heating wire being between 50 and 300 watts, thereby to maintain a surface temperature of said tube in the range of 40° to 105°C., and means resting on and covering the grate and providing a layer of material supplying microorganisms to initiate mouldering of said organic waste.

* * * * *